Jan. 14, 1969  H. W. CHRISTENSON ET AL  3,421,596
FOUR WHEEL DRIVE VEHICLE WITH HYDRODYNAMIC TORQUE
CONVERTER AND A.C. GENERATOR
DRIVE TRANSMISSION
Filed Jan. 18, 1965

INVENTORS
Howard W. Christenson,
BY & William G. Livezey

ATTORNEY

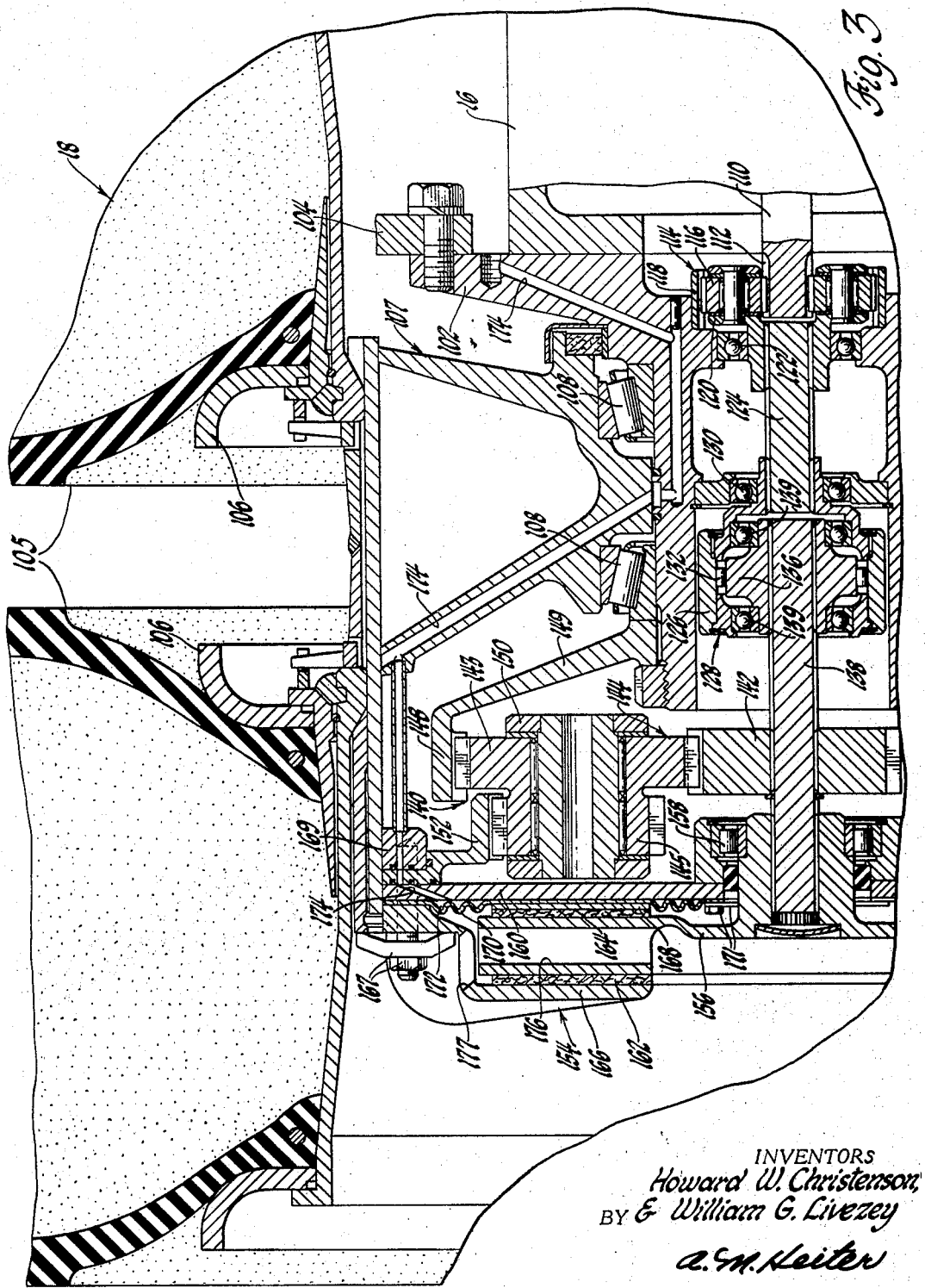

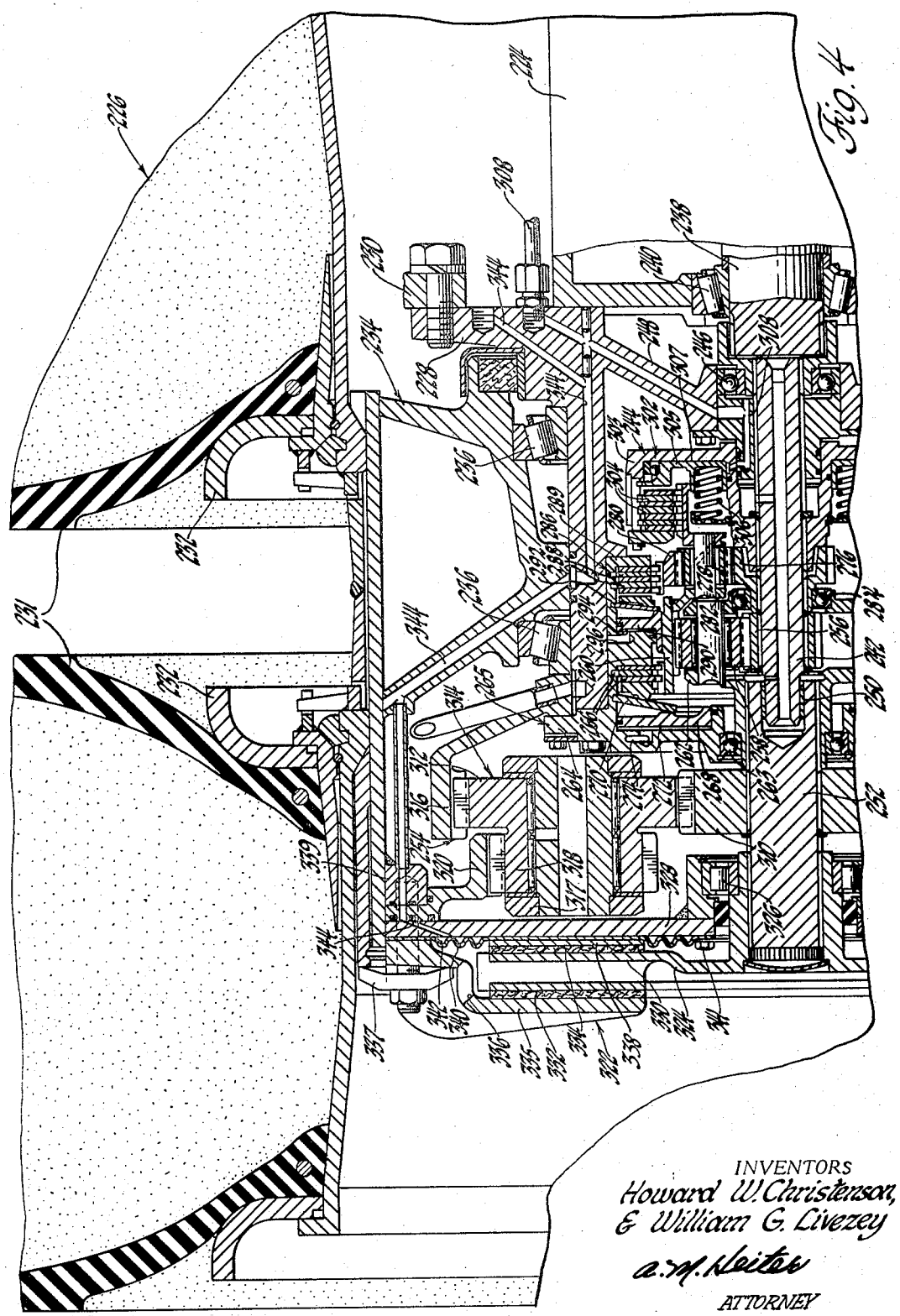

United States Patent Office

3,421,596
Patented Jan. 14, 1969

3,421,596
FOUR WHEEL DRIVE VEHICLE WITH HYDRODYNAMIC TORQUE CONVERTER AND A.C. GENERATOR DRIVE TRANSMISSION
Howard W. Christenson and William G. Livezey, Indianapolis, Ind., assignors to General Motors Corporation, Detroit, Mich., a corporation of Delaware
Filed Jan. 18, 1965, Ser. No. 426,330
U.S. Cl. 180—44                                                  19 Claims
Int. Cl. B60k 17/34

ABSTRACT OF THE DISCLOSURE

A transmission drive train system connects a prime mover to a vehicle's front and rear wheels and includes a hydrodynamic unit providing drive to an AC generator-plural AC motor set. Each motor output of the electric drive set is connected by a power wheel gear unit to a rear wheel. The front wheels are either driven by a similar electric drive set and power wheel gearing or through a multi-speed gear box driven by the hydrodynamic unit. The power wheel gear units are located in their respective wheels and are removable from the outboard side together with a wheel brake assembly. The brake assemblies are connected to their respective wheel gear units to handle a fraction of wheel torque and have dynamic brake members which rotate faster than wheel speed to provide pumping action for brake cooling.

---

This invention relates to transmission and more particularly to a generator-motor and torque multiplying and speed change transmission for power wheel drive.

In vehicles having multiple driving traction devices, such as wheels, substantially equal power distribution to each wheel must be available if maximum traction effort is to be obtained. This is especially important in the lowest operating drive range where loads are highest. Recognizing also that a generator-motor combination provides no torque multiplication, its use as an electrical drive shaft between the prime mover and driving wheels must be aided by torque multiplying and speed changing devices if the usefulness of the prime mover is to be extended.

In accordance with this invention, these results may be accomplished by employing a transmission drive train system to connect the prime mover to a plurality of traction devices, such as wheels, employing a prime mover driven hydrodynamic torque converter providing converter drive to one or more AC generator-plural AC motor sets. In one illustrative system, the motor outputs of one electric drive set are through reduction gearing to one pair of driving wheels with converter drive through a multiple-ratio gear unit to another pair of driving wheels. In another illustrative system, the motor outputs of two electric drive sets are through reduction gearing and multiple-ratio gear units to two pair of driving wheels. The motors of both systems which each drive one wheel together with the reduction gearing are located at the wheels as are the multiple-ratio gear units with the plural electric drive sets to provide compact final drive power wheel units.

In the transmission system where one generator-plural motor set is used, the AC generator is driven by the converter turbine shaft to power both the synchronous AC motors at the vehicle's rear wheels only in the lowest drive range, generator speed being directly proportional to the speed of the converter-gear unit driven front wheels. This enables maximum tractive ability to be obtained from the synchronous speed "positraction" effect of the AC motors while in the low drive range. The electric drive units are automatically disconnected when the multiple-ratio gear unit providing drive to the front wheels is shifted out of the low drive range so that there is only converter-geared drive through the remaining higher drive ranges where maximum tractive ability is not needed.

In the system where two generator-plural motor sets are used, the AC generators are driven by the converter turbine shaft through a differential torque divider which equally apportions the torque between the generators. The synchronous AC motor driven multiple-ratio gear unit at each wheel provides a selection of reduction drives and a direct drive. With all gear units conditioned for their lowest drive range, maximum tractive effort is available through speeding up of the prime mover which increases converter turbine torque to accelerate the generators and thus the vehicle. As the vehicle picks up speed, the converter automatically locks up through a lockup clutch giving a direct drive to the generators and straight electrical drives to the multiple-ratio gear units. When top vehicle speed is reached in the low drive range, the multiple-ratio gear units powered by one of the generator-plural motor sets are upshifted while the other pair of gear units remains in low. The power divider splits this ratio change while equally apportioning the torque between the generators, thus pulling the prime mover down only a fraction of a ratio step and permitting maintenance of higher prime mover speeds. The vehicle accelerates to the next shift point and this time the gear units which remained in low are upshifted to match the drive ratios of the already upshifted gear units. This shift sequence which continues until the highest drive ranges in all the gear units are reached thus alternates between matched and unequal drive ratios and provides additional operating ranges sandwiches between what would be considered as the normal drive ranges of the gear units to give closer ratio steps over the entire drive range.

Better braking efficiency at the wheels is also provided by advantageous employment of braking devices in the power wheel constructions whose dynamic members are connected to handle only a fraction of wheel torque and rotate at speeds faster than wheel speeds to provide a pumping action for greater air volume handling for brake cooling.

An object of this invention is to provide in a power wheel drive transmission, a power wheel drive train at the driving wheel having a reduction gear unit providing final reduction drive and a wheel brake connected with the gear unit to handle a fraction of wheel torque as determined by the gear unit and whose dynamic brake member speeds are faster than wheel speeds as determined by the gear unit to provide greater pumping action for brake cooling.

Another object of this invention is to provide in a power wheel drive assembly, a compact drive train assembly located in the wheel removable together with the wheel brake assembly without removal of the wheel spindle assembly.

Another object of this invention is to provide in a transmission for a vehicle power wheel drive, a troque converter driven generator-plural motor set whose motors are located at one pair of the vehicle's driving wheels with the generator speed being directly proportional to the speed of another pair of the vehicle's driving wheels which are driven through a multiple-ratio gear unit by the converter.

Another object of this invention is to provide in a transmission for a vehicle power wheel drive, torque converter driven generator-plural motor sets whose motors are located at the driving wheels and drive through multiple-ratio gear units also located at the wheels with the plural generators being driven by the converter through a differential torque divider to provide electric drives in all ranges of the multi-ratio units which are sequentially conditional for matched and unequal drive ratios to drive the wheels.

Another object of this invention is to provide in a power wheel drive transmission system, a torque converter connectible through different power paths to pairs of the vehicle's driving wheels, one power path including a multiple-ratio gear unit and another power path including an electrical drive provided by a generator-plural motor set, the generator of which is driven at converter turbine speed and only when the gear unit is conditioned in its lowest drive range.

Another object of this invention is to provide in a power wheel drive transmission system, a torque converter providing drive through plural power paths to a plurality of driving wheels with each power path including a generator-plural motor set to provide an electric drive and a multiple-ratio gear unit to provide a selection of reduction drives and direct drive with the converter driving the generators through a differential torque divider which equally apportions the torque between the generators during matched drive ratio conditions in the gear units and also when the gear units are conditioned for unequal drive ratios.

Another object of this invention is to provide in a power wheel drive transmission system, a torque converter driving a plurality of generators through a differential torque divider with each generator driving a plurality of wheel motors and each motor driving one wheel through a multiple-ratio gear unit to provide electric drive in all drive ranges for the gear units including operating ranges where the gear units are conditioned for matched gear ratios and operating ranges where the gear units are conditioned for unequal ratios.

Another object of this invention is to provide in a power wheel drive transmission system, torque converter-geared drive to one pair of driving wheels and torque converter drive through an AC generator-plural AC motor set to another pair of driving wheels in low range with the generator being driven directly by the converter turbine so its speed is directly proportional to the speed of the geared driving wheels to obtain maximum tractive ability from synchronous speed "positraction" effect of the synchronous AC motors and with the electric units being all automatically disconnected when the geared drive is shifted out of its lowest range permitting only converter-geared drive through the remaining higher drive ranges.

Another object of this invention is to provide in a power wheel drive transmission system, a torque converter driving a pair of AC generators through a differential torque divider with each generator powering a pair of synchronous AC wheel motors and each motor driving a traction wheel through a multiple-ratio gear unit, the gear units being conditional for matched and also unequal drive ratios and brake devices in the power wheel construction whose dynamic members carry a fraction of wheel torque and rotate at speeds faster than wheel speed to provide a pumping action for brake cooling.

These and other objects of the invention will be more apparent from the following description of the preferred embodiments of the invention illustrated in the drawings:

FIGURE 1 diagrammatically shows a vehicle having a prime mover and one embodiment of a power wheel drive transmission system constructed according to this invention.

FIGURE 2 diagrammatically shows a vehicle having a prime mover and another embodiment of a power wheel drive transmission system constructed according to this invention.

FIGURE 3 shows an actual construction of a component of the power wheel drive transmission system shown in FIGURE 1.

FIGURE 4 shows an actual construction of a component of the power wheel drive transmission system shown in FIGURE 2.

Figure 1:
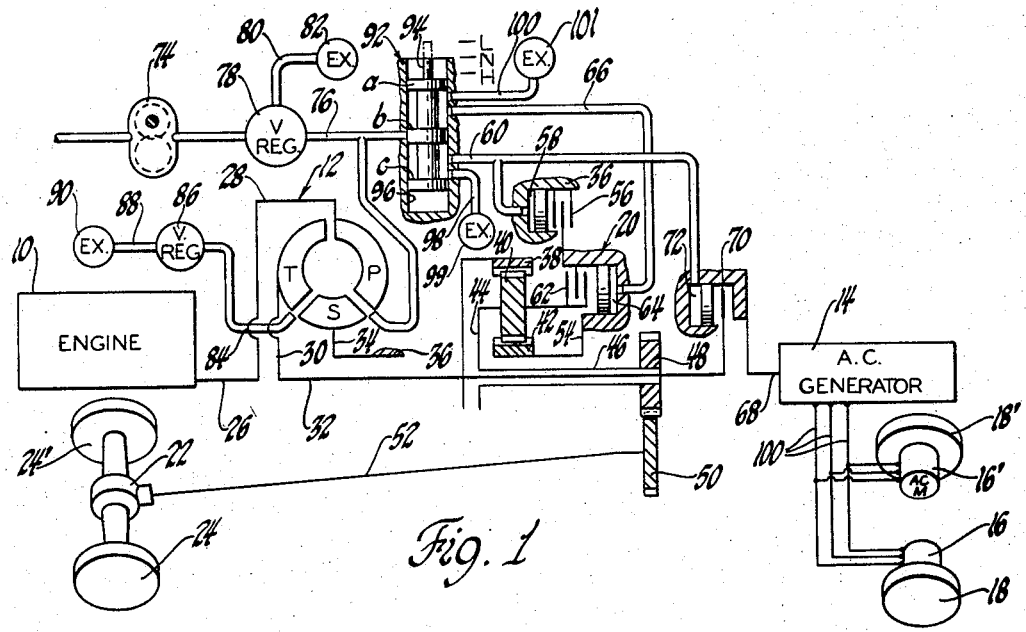

The embodiment of the invention in FIGURE 1 is illustrated in a four wheel drive vehicle having an internal combustion engine 10 as its prime mover which provides power to drive a hydrodynamic torque converter 12. In the transmission system generally, converter drive is available to an AC generator 14-plural, synchronous AC motors 16, 16' set to drive the vehicle's rear wheel assemblies 18, 18' through a multiple-ratio gear unit 20 and is also available to a conventional differential torque divider and speed reduction gear unit 22 to drive the vehicle's steerable front wheel assemblies 24, 24'.

The engine output shaft 26 is connected to drive the rotary torque converter housing 28 which drives the torque converter pump P. As in conventional three element torque converters, the pump P circulates fluid in a toroidal circuit to drive the turbine T, which is connected by a hub 30 to the torque converter output or turbine shaft 32. The stator S provides reaction in the fluid circuit and is held against backward rotation by a one-way brake (not shown) or fixed by the hub structure 34 to the housing 36 for the converter 12 and gear unit 20.

The converter output shaft 32 drives the ring gear 38 of gear unit 20, ring gear 38 meshing with planetary pinions 40 which in turn mesh with sun gear 42. Pinions 40 are mounted on a carrier 44 driving the gear unit's output sleeve shaft 46 which surrounds converter output shaft 32 and extends centrally through sun gear 42 to connect with a spur gear 48. Gear 48 meshes with a spur gear 50 of the same pitch diameter which drives a propeller shaft assembly 52. Propeller shaft assembly 52, which has conventional universal joints, is connected to drive the differential and reduction gear unit 22. Sun gear 42 is connected to a control hub 54 which can be connected to housing 36 by a brake 56 actuated by a motor 58 on the supply of fluid under pressure via connected line 60. Control hub 54 can also be connected to the carrier 44 by clutch 62 which is engaged when motor 64 is supplied via line 66 by fluid under pressure.

When sun gear 42 is braked by brake 56 the carrier 44 and connected output shaft 46 are driven by shaft 32 in the forward direction and at a reduced speed to provide a low drive. When sun gear 42 and carrier 44 are connected by clutch 62, gear unit 20 is locked up and the output shaft 46 is driven by shaft 32 in the forward direction at the same speed to provide a high or direct drive.

The converter output shaft 42 can also be directly connected to drive the generator input shaft 68 by clutch 70 when motor 72 is supplied with fluid under pressure via line 60 which also supplies the low brake motor 58. The friction clutches and brakes described above have suitable retraction springs, not shown, for disengagement.

Gear unit 20 will thus provide two forward speed ranges, those being a low or reduction drive and a high or direct drive and in addition there is provided a converter drive to generator 14. These drives are controlled by a transmission control system supplied with fluid under pressure from a suitable collecting sump, now shown, by an engine or input driven pump 74. This pump supplies fluid to a main line 76 at a pressure regulated by regulator valve 78 which exhausts overage to the sump via overage line 80 and exhaust 82.

Fluid at main line pressure is supplied to converter 12 where pressure is regulated through line 84 by a regulator valve 86 which exhausts overage to the sump through line 88 and exhaust 90.

Selector valve 92 provides the control to selectively connect main line 76 with the motor lines and includes a manually controlled valve element 94 having equal diameter lands $a$, $b$ and $c$ slidably mounted in bore 96 of the valve housing. In the neutral control valve position (N) as shown in FIGURE 1, land $b$ blocks main line 76, line 60 is connected in the bore between lands $b$ and $c$ through line 98 to exhaust 99 and motor line 66 is connected in the bore between lands $a$ and $b$ through line 100 to exhaust 101, all exhausts being connected to the sump. Selector valve element 94 when moved to the low drive position (L) connects main line 76 between lands $b$ and $c$ to line 60 which feeds both the low brake motor 58 for low drive and the generator clutch motor 72. Valve element 94 when moved to the high drive position (H) connects main line 76 between lands $a$ and $b$ to the high clutch line 66 which feeds the high clutch motor 64 for high drive. In each drive ratio the motor lines not supplied with fluid under pressure are exhausted.

Electric power from the AC generator 14 is connected by lines 100 to the synchronous AC motors 16, 16' which complete the electric drive to the rear driving wheel assemblies 18, 18'. Since both the electric motors 16, 16' and their drive connections to the rear driving wheels are the same, the following description of motor 16 and its drive connection also applies to the other motor 16' and its drive connection.

Motor 16, as best shown in FIGURE 3 in an actual power wheel construction, is rigidly connected by bolts, not shown, to the nonrotatable wheel spindle 102 which is connected through suitable linkage, a portion of which is shown at 104, to the vehicle chassis, not shown. The wheel assembly 18 has duel tires 105 which are rotatably supported through rims 106 and associated hub structure 107 by antifriction bearings 108 on the wheel spindle 102. The electric motor output shaft 110 has an integral sun gear 112 which provides input drive to a reduction gear unit 114 and meshes with planetary pinions 116. Pinions 116 in turn mesh with a ring gear 118 which is rigidly secured to spindle 102 to provide reaction for this gear unit. Pinions 116 are mounted on a carrier 120 which is rotatably supported by an antifriction bearing 122 in the hollow wheel spindle 102 and connected through its hub to drive an intermediate shaft 124 which is thereby driven in the forward direction and at a reduced speed relative to motor shaft 110.

Shaft 124 is in turn connected to drive the input or outer race member 126 of a one-way clutch 128, the hub of the outer race member together with the connected outboard end of shaft 124 being supported by an antifriction bearing 130 in a supporting web secured in spindle 102. Rollers 132 provide a positive drive between the outer race cam member 126 and an inner race member 136 which is connected to drive a final drive gear reduction input shaft 138 when member 126 is driven forwardly by the electric motor 16. Rollers 132 permit overrunning of shaft 138 relative to shaft 124 in the forward direction on the antifriction bearings 139 between the race members for reasons which will become more apparent from the description of operation which follows subsequently.

A planetary gear unit 140 completes the final drive from shaft 138 to driven wheel hub 107 and comprises a sun gear 142 driven by shaft 138 meshing with the larger pinions 143 of the compound planetary pinions 144. Larger pinions 143 in turn mesh with a ring gear 148 grounded for reaction through integral hub 149 to the nonrotatable wheel spindle 102. The compound planetary pinions 144 are mounted on a carrier 150 free to rotate and the smaller pinions 145 mesh with a second ring gear 152 which is rigidly connected to drive wheel hub 107. Rotation of sun gear 142 in the forward direction will then rotate ring gear 152 and connected wheel hub 107 in the forward direction and at a reduced speed relative to shaft 138.

A disc brake 154 when engaged brakes wheel hub 107 and comprises a brake disc 156 whose hub is connected to the outboard end of shaft 138. Disc 156 together with shaft 138 is supported by an antifriction bearing 158 in a bearing plate 160 which is rigidly secured to the rotatable wheel hub 107. Friction rings 162 and 164 sandwich the opposite brake surfaces of brake disc 156. Ring 162 is bonded to an annular brake reaction member 166. Member 166 is rigidly secured by bolt and clamp assemblies 167 to a mounting ring 169 welded to the wheel hub structure 107, these bolt and clamp assemblies also serving to rigidly secure plate 160 and ring gear 152 to wheel hub 107. Friction ring 164 is bonded to a backing plate 168 which in turn is rigidly secured to a metallic bellows-type diaphragm 170. The annular diaphragm 170 is rigidly secured to plate 160 at its outer radius by bolt and clamp assemblies 167 and at its inner radius by a bolt and ring assembly 171.

The diaphragm 170 through its sealing contact at its inner and outer radii with plate 160 provides a motor chamber 172. Chamber 172 when supplied with fluid under pressure from any suitable source via fluid passage 174 expands to pack the rotating friction rings 162, 164 and the rotating brake disc 156. With brake 154 engaged, relative rotation between wheel hub 107 and shaft 138 is prevented and thus relative rotation between ring gear 152 and sun gear 142 of gear unit 140 is prevented providing lockup in this gear unit. Since ring gear 148 is grounded to nonrotatable wheel spindle 102, the rotating wheel hub 107 is brought to rest. The spring action of the metallic diaphragm 170 retracts the friction ring 164 when chamber 172 is exhausted to fully disengage the brake.

Brake disc 156 has a plurality of pump vanes provided by circumferentially spaced, radially extending, straight through slots 176 between the disc braking surfaces which during brake engagement provide an air pumping action for brake cooling. The pumped air is vented through slots 177 in member 166. Since brake disc 156 will be rotating at a speed faster than wheel speed as determined by the reduction ratio in gear unit 140, the volume of air pumped will be greater than that available when the brake disc rotates at wheel speed. Another feature of this brake is that it is only required to handle a fraction of wheel torque as determined by gear unit 140 and thus can be of smaller capacity than a brake handling full wheel torque.

Describing now the operation of the FIGURE 1 embodiment, this power wheel drive transmission system provides four wheel drive through geared drive to the front driving wheels and electric motor drive to the rear driving wheels in the low drive range of controlled gear unit 20. With selector valve 92 conditioned for low, low brake motor 58 is supplied with main line pressure for engagement of low brake 56 to provide the low reduction drive to the differential and reduction gear unit 22 to drive the front wheels. The generator clutch motor 72 is simultaneously supplied with main line pressure to engage the clutch 70 to provide direct converter or turbine drive to generator 14 to power the motors 16, 16' to drive the rear wheels.

By design, there is provided a slightly larger speed reduction between turbine shaft 32 and the front wheels in the low drive range than the speed reduction between turbine shaft 32 and the rear wheels. The vehicle being initially at rest, the engine 10 is then accelerated and since the front and rear vehicle wheels rotate at the same speed by virtue of ground contact, the small difference in speed reduction in low forces slip between the AC generator 14 and synchronous AC motors 16, 16' recognizing that such slip is required before the synchronous motors will pull sufficient driving torque. Generator 14 is driven by turbine shaft 32 so its speed is directly proportional to the geared front wheels and thus maximum tractive ability is obtained from the synchronous speed positraction effect of the AC motors 16, 16' driving the rear wheels.

When top speed is reached in the low drive range, selector valve 92 is then conditioned to upshift gear unit 20 for high drive. Main line pressure is supplied via line 66 to high clutch motor 64 to engage high clutch 62 and provide the direct drive between turbine shaft 32 and output shaft 46. At the same time, line 60 is exhausted to simultaneously disengage low brake 56 and generator clutch 70. Thus the generator-plural motor set is automatically disconnected when controlled gear unit 20 is shifted out of the low range to the high range permitting full converter drive to the front vehicle wheels in the high drive range where maximum tractive ability is not needed. In the high drive range the one-way clutches, having the clutch construction 128, in the drive trains between the motors and rear wheels, permit the rear wheels to overrun their electric motors in the forward direction so that the motors are effectively disconnected and present no load for the driving front wheels.

This power drive transmission system has enhanced reliability due to its simplicity in that there are no transmission shift controls or fluid lines to the wheels and since low range fluid pressure automatically engages the generator drive clutch to excite the excitor field circuit, no switches are needed between the generator and motors. In addition since the vehicle loading is intermittent duty, the electrical components can be lightweight-heavily loaded units and still have long service life.

Figure 2:
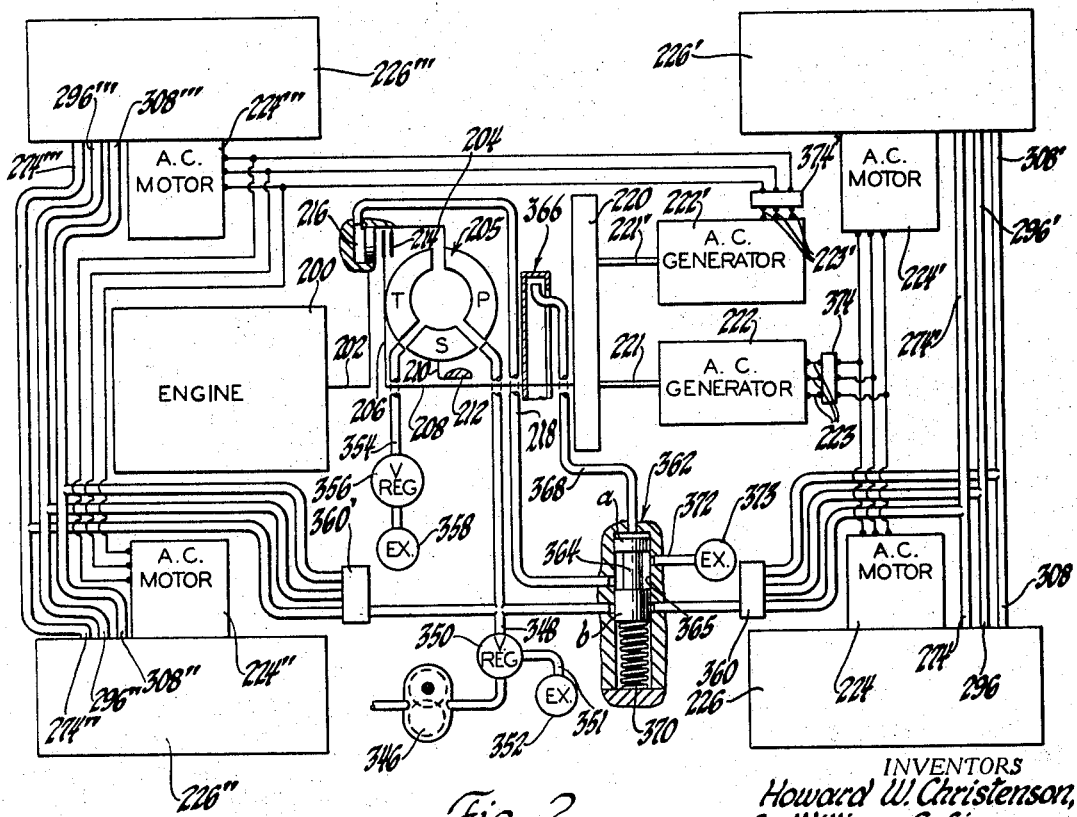

Referring now to the embodiment shown in FIGURES 2 and 4, engine 200 has its engine output shaft 202 driving rotary torque converter housing 204 which drives torque converter pump P of torque converter 205. Turbine T is connected by hub 206 to drive torque converter output or turbine shaft 208 and stator S is held against backward rotation by a one-way brake, not shown, or fixed by hub structure 210 to stationary converter housing 212.

A lockup clutch 214 when engaged directly connects input housing 204 through hub 206 to output shaft 208. Clutch engagement is effected by a fluid actuated motor 216 operated on supply of fluid under pressure from a line 218 as will be subsequently explained. Suitable retraction springs, not shown, disengage the lockup clutch.

Converter output shaft 208 drives through a conventional differential torque divider 220, the input shaft 221 of the AC generator 222 and the input shaft 221' of the AC generator 222'. The electric power of AC generator 222 is connected by lines 223 to two rear synchronous AC motors 224, 224' powering the rear wheel assemblies 226, 226' respectively and the electric power of AC generator 222' is connected by the lines 223' to the two forward synchronous AC motors 224", 224'" powering the front wheel assemblies 226", 226'" respectively. Differential torque divider 220 in a conventional manner equally apportions the torque of shaft 208 between generator shafts 221, 221' while permitting a relative speed difference between the generator shafts for reasons which will become more apparent.

Since synchronous AC motors 224, 224', 224" and 224'" are the same as are their drive trains to the wheels, the following description directed to motor 224 and its drive train also applies to the other motors and their drive trains. Referring to FIGURE 4, motor 224 in the actual wheel assembly construction is rigidly connected by bolts, not shown, to the nonrotatable wheel spindle 228 which is connected to the vehicle chassis through suitable suspension linkage, a portion of which is shown at 230. The dual tires 231 are rotatably supported through their rims 232 and associated hub structure 234 by antifriction bearings 236 on wheel spindle 228. Motor 224 has its output shaft 238 rotatably supported by an antifriction bearing 240 in the motor housing and drive connected to the intermediate or input shaft 242 of a multiple-ratio gear unit generally designated at 244.

Gear unit 244 is located within hollow wheel spindle 228 which provides the transmission casing or housing for this unit. Shaft 242 is rotatably supported at its right-hand end by an antifriction bearing 246 in the web 248 of the wheel spindle. Shaft 242 at its left-hand end is rotatably supported by an antifriction bearing sleeve 250 in an accommodating end bore in shaft 252 which is the input to the final reduction gear unit 254 which completes the drive to wheel hub 234.

Gear unit 244 provides a selection of three speed ratios. Motor driven shaft 242 drives sun gear 256 of the low speed gear set. Sun gear 256 meshes with planetary pinions 258 which in turn mesh with ring gear 260. Pinions 258 are mounted on a carrier 262 connected to drive shaft 252 which drives the reduction gear unit 254. An antifriction bearing 263 rotatably mounts the hub of carrier 262 and connected right-hand end of shaft 252 in a closure plate 264 bolted to the outboard end of wheel spindle 228. Ring gear 260 may be braked to the housing provided by wheel spindle 228 by the brake and motor assembly generally designated at 265 to provide low ratio.

Assembly 265 comprises a plurality of friction plates 266 having alternate plates splined at their inner radius to ring gear 260 and an intermediate plate splined at its outer radius to the closure plate 264. The motor comprises a piston 268 normally held in a retracted position by a Belleville spring 270 whose inner radius is urged rightwardly when fluid under pressure is supplied to motor chamber 272 via low ratio line 274. The spring 270 which is levered for mechanical advantage engages the friction plates to provide the low ratio which rotates carrier 262 and connected shaft 252 in the forward direction and at a reduced speed relative to driving shaft 242.

Shaft 242 also drives sun gear 276 which meshes with pinions 278 which in turn mesh with ring gear 280. Pinions 278 are mounted on a carrier 282 which drives ring gear 260 of the low ratio gear set. An antifriction bearing 284 rotatably mounts carrier 262 on the hub of sun gear 276. Ring gear 280 is retarded or braked by connection to wheel spindle 228 through operation of the brake and motor assembly generally designated at 286. The brake comprises a plurality of friction plates 288 having alternate plates splined at their inner radius to ring gear 280 and intermediate plates splined at their outer radius to a reaction collar 289 secured to wheel spindle 228. The motor comprises an apply piston 290 normally held in a retracted position by a Belleville spring 292 whose inner radius is urged rightwardly by the piston upon the supply of fluid under pressure to motor chamber 294 via intermediate ratio line 296. This spring movement packs the friction plates for braking, the spring being levered for mechanical advantage. Actuation of this brake to retard ring gear 280 causes ring gear 260 of the low ratio gear set to be driven forward at a slow speed to provide intermediate ratio.

High ratio in gear unit 244 is provided by the clutch and motor assembly generally designated at 302 which when actuated connects shaft 242 and carrier 282. The assembly 302 comprises a motor housing member 303 driven by shaft 242 with there being provided a plurality of friction plates 304 having alternate plates splined at their outer radius to member 303 and intermediate plates splined at their inner radius to a hub extension of carrier 282. The apply piston 305 is held in its retracted position by coil springs 306 and is urged leftwardly to pack the friction plates upon the supply of fluid under pressure to the motor chamber 307 via the high ratio line 308. With engagement of this clutch preventing rotation between shaft 242 and carrier 282, both the gear sets of this gear unit are effectively locked up and there is provided a direct drive through the gear unit between shafts 242 and 252.

Shaft 252 drives sun gear 310 of the final reduction gear unit 254. Sun gear 310 meshes with the larger pinions 312 of the compound planetary pinions 314, these same larger pinions meshing with the ring gear 316 which is a nonrotatable reaction member by virtue of its rigid connection to wheel spindle 228. Compound pinions 314 are mounted on the carrier 317 and have their smaller pinions 318 meshing with the second ring gear 320 which drives wheel hub 234 in the same forward direction as shaft 252 and at a lower speed.

The brake assembly 322 to brake wheel hub 234 like the wheel brake assembly shown in FIGURE 3, has its brake disc 324 connected through its hub to the extreme left-hand end of shaft 252, the hub and connected shaft 252 being supported by the antifriction bearing 326 in the bearing plate 328 rigidly connected to wheel hub 234. The disc 324 has radial slots 330 providing pump vanes for brake cooling and its opposite braking surfaces are sandwiched between the friction rings 332, 334. Friction ring 332 is bonded to the annular brake reaction member 335 rigidly connected to wheel hub 234, member 335 having slots 336 for air ventilation of the pumped cooling air. Member 335 is rigidly secured by bolt and clamp assemblies 337 to a mounting ring 339 welded to the wheel hub 234, these bolt and clamp assemblies also serving to rigidly secure the plate 328 and ring gear 320 to the wheel hub 234. Friction ring 334 is bonded to backing plate 338 rigidly secured to the metallic bellows-type diaphragm 340. Diaphragm 340 is sealingly secured to plate 328 at its inner radius by the bolt and ring assembly 341 and at its outer radius by the bolt and clamp assemblies 337. Bearing plate 328 and diaphragm 340 delineate the brake apply chamber 342 which when supplied with fluid under pressure via line 344 packs the friction members to apply the brake.

Describing now the control system shown in FIGURE 2, to control the multiple-ratio gear unit at each driving wheel, fluid under pressure is supplied to this system from a sump, not shown, by an engine or input driven pump 346 which supplies fluid to a main line 348 at a pressure regulated by regulator valve 350. Fluid overage from valve 350 is returned to the sump via overage line 351 and exhaust 352. Main line fluid is supplied to converter 205 where pressure is regulated through a line 354 by a regulator valve 356 which exhausts overage via exhaust 358 to the sump. Fluid from main line 348 is also supplied by a three-position selector valve 360 selectively to the connected corresponding low ratio lines 274, 274', intermediate ratio lines 296, 296' and high ratio lines 308, 308' of the multiple-ratio gear units of both rear wheels. In like manner an identical selector valve 360' will selectively supply fluid from main line 348 to the front wheel multiple-ratio gear unit's connected corresponding low ratio lines 274'', 274''', intermediate ratio lines 296'', 296''' and high ratio lines 308'', 308'''. The selector valves 360, 360' may be of the type shown in United States Patent No. 3,033,333 issued May 8, 1962 to Ulysses A. Breting and Robert M. Tuck.

Controlled fluid supply from main line 348 to lockup clutch motor line 218 is provided by the lockup shift valve 362 which has a spool valve element 364 having lands $a$ and $b$ of equal diameter slidable in the valve housing bore 365. A conventional Pitot governor 366 supplies a governor line 368 with pressure proportional to the converter output or turbine shaft speed. The governor line 368 is connected to deliver this governor pressure to act on the end of land $a$ to bias spool valve element 364 in a direction opposite the biasing direction of spring 370 acting on the opposite end of the spool valve element. Valve 362 is calibrated such that when the turbine T reaches an intermediate speed in the lowest operating range subsequently to be discussed, the governor pressure urges valve element 364 against spring 370 from the position shown, in which line 218 is exhausted between lands $a$ and $b$ to the sump via line 372 and exhaust 373, to a position where the exhaust line 372 is blocked by land $a$ and main line 348 is connected between lands $a$ and $b$ to the lockup clutch motor line 218. Valve 362 does not affect main line 348, main line 348 including an annular port in the housing of valve 362 around or bypassing land $b$.

Describing the operation of this power wheel drive transmission system, there is provided AC electric drive in all operating drive ranges provided by the multiple-ratio gear units at the wheels, the generators and motors acting as electrical drive shafts inherently having no torque multiplying ability but capable of delivering the full torque output of torque converter output shaft 208. To start the vehicle the operator shifts to a drive range, for example, the low drive range where main line fluid pressure is supplied by selector valves 360, 360' to the low ratio lines of all four multiple ratio gear units. The torque converter supplies starting torque to generators 222, 222' whose exciter current then couples the motors to their generators and since the motors are stopped the generators practically stop. Increasing engine shaft speed increases converter turbine torque to start the vehicle rolling and by virtue of the torque converter being in the main drive line, high slip losses are absorbed in the torque converter and not in the electrical system. As the vehicle picks up speed governor pressure controls lockup shift valve 362 to lock up the converter clutch 214, thus giving a straight electrical drive. When top speed is reached in this low operating range only one set of driving wheels, preferably the front vehicle wheels which are handling the least load, are upshifted by disengaging the low ratios in the front wheel multiple-ratio gear units and engaging their intermediate ratios through control of selector valve 360'. Lockup clutch 214 may be disengaged to cushion this shift and subsequent shifts if this is desired by the employment of a lockup clutch cutoff valve such as that shown in United States Patent No. 3,128,642 issued Apr. 14, 1964 to William B. Clark et al. since the lockup clutch shift valve shown will continue to hold this clutch engaged in the remaining drive ranges.

If, for example, all the multiple ratio gear units provide a 4:1 gear reduction in low, a 2:1 gear reduction in intermediate and 1:1 or direct drive in high, there will occur an upshift of a 2:1 ratio step for this shift and each succeeding shift. The differential torque divider 220 splits this ratio while equally apportioning the converter torque between the generators so that the engine is pulled down only a 1.414 ratio step which is determined by taking the square root of the ratio of the gear reduction in low divided by the gear reduction in intermediate. Under these conditions the generators while operating at the same torque levels operate at different power levels with the larger power level being at generator 222 which powers the motors for the rear wheels which bear the heavier load. The vehicle then accelerates to the next shift point and this time the rear wheel multiple-ratio gear units are shifted from their low drive ratio to their intermediate drive ratio by control of selector valve 360 while the front wheel multiple-ratio gear units remain in intermediate. Under these conditions torque and power are equally divided between the generators and again the engine has been pulled down only a 1.414 ratio step. This shift sequence is repeated until top vehicle speed is reached by next upshifting the front wheel gear units to high while the rear gear units remain in intermediate and finally upshifting the rear gear units to high. Thus with a three speed range gear unit at each wheel five operating drive ranges are available. In addition the vehicle may be started in any of these drive ranges with the electric drive providing some cushioning. Full range reverse operation is provided by control of the reversal switches 374, 374' in lines 223, 223' respectively which reverse the direction of motor armature current.

Other features of the two embodiments of the power wheel drive transmission system include easy removal of the components of the final drive which may be effected without removal of the wheel hub and spindle from the vehicle. For example, in the FIGURE 3 construction the removal of brake assembly 154, gear unit 140 and one-way clutch assembly 128 is easily accomplished from the outboard wheel side. In the FIGURE 4 construction, the removal of brake assembly 322, gear unit 254 and gear unit 244 is also easily accomplished from the outboard wheel side.

We claim:
1. A transmission for a vehicle having a plurality of pairs of driving traction devices comprising,
   (a) a hydrodynamic torque converter having a power driven input and an output, a drive train system for providing a first power path from said output of said torque converter to a first pair of the driving traction devices and a second power path from said output of said torque converter to a second pair of the driving traction devices,
(b) at least one of said power paths including a generator powering a pair of motors with each said motor powering one driving traction device in said one power path,
(c) and multiratio drive means in at least one of said power paths for selectively providing a plurality of different drive ratios in said last mentioned power path.

2. A transmission for a vehicle having a plurality of pairs of driving traction devices comprising,
(a) a hydrodynamic torque converter, a generator-dual motor set powered by said torque converter,
(b) drive train means operatively connecting one motor to one driving traction device of one pair of driving traction devices, drive train means operatively connecting the other motor to the other driving traction device of said one pair of driving traction devices,
(c) each drive train means including a speed reduction and torque multiplying drive unit providing speed reduction and torque multiplication between said motors and associated driving traction devices,
(d) and each drive train means further including brake means for braking the associated driving traction device operatively connected to the associated drive unit for handling a fraction of traction device torque as determined by the associated drive unit.

3. The transmission set forth in claim 2 and each brake means further including brake coolant pumping means for brake cooling operatively connected to the associated drive drive unit for pumping at speeds faster than traction device speed as determined by the associated drive unit.

4. A transmission for a vehicle having a plurality of pairs of driving traction devices comprising,
(a) a hydrodynamic torque converter and a generator-dual motor set and a multiple-ratio drive unit both powered by the output of said torque converter,
(b) drive train means operatively connecting one of said motors to one driving traction device and the other motor to the other driving traction device of one pair of the driving traction devices,
(c) and drive train means including differential torque divider means operatively connecting said multiple-ratio drive unit to another pair of the driving traction devices.

5. A transmission for a vehicle having a plurality of pairs of driving traction devices comprising,
(a) a hydrodynamic torque converter, a drive train system for providing a first power path from the output of said torque converter to a first pair of the driving traction devices and a second power path from the output of said torque converter to a second pair of the driving traction devices,
(b) said first power path including differential torque divider means for equally apportioning the torque while permitting a relative speed difference between the driving traction devices of said first pair,
(c) and said second power path including a generator powering a pair of motors with each said motor powering one driving traction device of said second pair.

6. A transmission for a vehicle having a plurality of pairs of driving traction devices comprising,
(a) a hydrodynamic torque converter, a drive train system for providing a first power path from the output of said torque converter to a first pair of driving traction devices and a second power path from the output of said torque converter to a second pair of driving traction devices,
(b) said first power path including multiple-ratio drive means selectively conditionable to provide a plurality of different drive ratios and means for equally apportioning the drive means output torque between said first pair of driving traction devices while permitting a relative speed difference therebetween,
(c) and said second power path including a generator, a pair of motors powered by said generator, each said motor powering one driving traction device of said second pair of said driving traction devices and means controlled by the conditioning of said multiple-ratio drive means operable to drivingly connect said generator to said torque converter only when said multiple-ratio drive means is conditioned for one of said drive ratios.

7. In a vehicle the combination comprising,
(a) a pair of front wheel assemblies and a pair of rear wheel assemblies,
(b) a drive train system operatively connected to drive said wheel assemblies including a hydrodynamic torque converter having a converter output, a first power path for power transmittal from said converter output to said front wheel assemblies and a second power path for power transmittal from said converter output to said pair of rear wheel assemblies,
(c) said first power path including a multiple-ratio drive unit connected to be driven by said converter output and having a drive unit output and being selectively conditionable to provide a plurality of drive ratios between said converter output and said drive unit output, differential torque and speed reduction means connecting said drive unit output to said front wheel assemblies to provide equal apportioning of torque while permitting a relative speed difference between said front wheel assemblies and in addition a speed reduction between said drive unit output and said front wheel assemblies,
(d) said second power path including a generator, a pair of motors electrically coupled to said generator, a first drive transmitting assembly for drive connecting one motor to one rear wheel assembly, a second drive transmitting assembly for drive connecting the other motor to the other rear wheel assembly, said drive transmitting assemblies each including speed reduction means and one-way clutch means, said one-way clutch means being operable to transmit drive from said motors to said rear wheel assemblies and prevent drive from being transmitted from said rear wheel assemblies to said motors, connecting means operable to connect and disconnect said converter output and said generator,
(e) and control means for selectively controlling said multiple-ratio drive unit and said connecting means to simultaneously establish the lowest drive ratio of said multiple-ratio drive unit and converter output drive to said generator and to disconnect said converter output and said generator while establishing the remaining drive ratios of said multiple-ratio drive unit.

8. The combination set forth in claim 7 and said power paths providing different speed reductions when said lowest drive ratio is established.

9. The combination set forth in claim 7 and said generator being an AC generator and said motors being synchronous AC motors.

10. A transmission for a vehicle having a plurality of pairs of driving traction devices,
(a) a multiple-ratio drive unit for each driving traction device selectively conditionable to provide a plurality of different drive ratios for driving the associated driving traction device,
(b) a generator and a pair of motors powered by said generator of each pair of driving traction devices and associated drive units with each motor drivingly connected to power only one drive unit and associated driving traction device,
(c) and power input means for said generators including differential torque divider means for equally apportioning input torque between said generators.

11. The transmission set forth in claim 10 and means for reversing the driving direction of said motors.

12. A transmission for a vehicle having a plurality of pairs of driving traction devices,
(a) a hydrodynamic torque converter,
(b) each driving traction device having a multiple-ratio drive unit selectively conditionable to provide a plurality of drive ratios for driving the associated driving traction device,
(c) and drive train means for operatively connecting said torque converter to said drive units including a plurality of generator-dual motor sets whose dual motors each power only one of a pair of the driving traction devices.

13. The transmission set forth in claim 12 and said drive train means further including differential torque divider means between said torque converter and said generators.

14. A transmission for a vehicle having a plurality of pairs of driving traction devices,
(a) a hydrodynamic torque converter,
(b) each driving traction device having a multiple-ratio drive unit selectively conditionable to provide a plurality of drive ratios for driving the associated driving traction device,
(c) drive train means for operatively connecting said torque converter to said drive units including a plurality of generator-dual motor sets whose dual motors each power only one of a pair of the driving traction devices and differential torque divider means between said torque converter and said generators,
(d) and control means operable to control simultaneously and selectively each pair of drive units associated with each generator-dual motor set.

15. A transmission for a vehicle having a plurality of pairs of driving traction devices comprising,
(a) a hydrodynamic torque converter, a drive train system for providing a power path from said torque converter to each pair of said driving traction devices,
(b) said power path including a generator for each pair of driving traction devices, a pair of motors powered by each generator and a pair of selectively conditionable multiple-ratio drive means for connecting said pair of motors separately to the associated pair of driving traction devices,
(c) and differential torque divider means in said power path operatively connecting said generators to said torque converter for equally apportioning the torque between the generators when said pairs of multiple ratio drive means are selectively conditioned for matched drive ratios where said generators operate at the same speed and for different drive ratios where said generators operate at different speeds.

16. In a vehicle the combination comprising,
(a) a pair of front wheel assemblies and a pair of rear wheel assemblies,
(b) a drive train system operatively connected to drive said wheel assemblies including a hydrodynamic torque converter having a converter output, differential torque divider means having a torque divider input and a pair of torque divider outputs, said converter output being connected to drive said torque divider input and said differential torque divider means equally apportioning input torque while permitting a relative speed difference between said torque divider outputs, a first power path for power transmittal from one torque divider output to said front wheel assemblies and a second power path for power transmittal from the other torque divider output to said rear wheel assemblies,
(c) said first power path including a generator driven by said one torque divider output, a pair of motors electrically coupled to said generator, a drive transmitting assembly including a multiple-ratio drive unit for drive connecting one motor to one front wheel assembly and a drive transmitting assembly including a multiple-ratio drive unit for drive connecting the other motor to the other front wheel assembly,
(d) said second power path including a generator driven by said other torque divider output, a pair of motors electrically coupled to said generator, a drive transmitting assembly including a multiple-ratio drive unit for drive connecting one motor to one rear wheel assembly and a drive transmitting assembly including a multiple-ratio drive unit for drive connecting the other motor to the other rear wheel assembly,
(e) said multiple-ratio drive units providing a selection of matched drive ratios,
(f) and a control system for controlling said multiple-ratio drive units including control means for selectively controlling simultaneously said multiple-ratio drive units providing drive to said rear wheel assemblies and control means for selectively controlling simultaneously said multiple-ratio drive units providing drive to said front wheel assemblies.

17. The combination set forth in claim 16 and switch means for reversing the drive in the motors in said first and second power paths.

18. The combination set forth in claim 16 and said generators being AC generators and said motors being synchronous AC motors.

19. A transmission for a vehicle having a plurality of pairs of driving traction devices comprising,
(a) a hydrodynamic torque converter having a power driven input and an output, a drive train system for providing a first power path from said output of said torque converter to a first pair of the driving traction devices and a second power path from said output of said torque converter to a second pair of the driving traction devices,
(b) at least one of said power paths including a generator powering a pair of motors with each said motor powering one driving traction device in said one power path,
(c) and variable torque multiplication means in at least one of said power paths for providing variable torque multiplication in said last mentioned power path.

References Cited

UNITED STATES PATENTS 3,352,373 11/1967 Tuck _____ 180—44
871,098 11/1907 Albrecht _____ 180—44 X

FOREIGN PATENTS 840,494 7/1960 Great Britain.

A. HARRY LEVY, *Primary Examiner.*

U.S. Cl. X.R.

180—65, 60, 75; 60—12, 54; 290—1; 74—801; 188—18, 264